Aug. 24, 1948. A. H. CANDEE 2,447,633
ELECTRIC VEHICLE CONTROL SYSTEM
Filed Aug. 30, 1946

WITNESSES:

INVENTOR
Andrew H. Candee.
BY
ATTORNEY

Patented Aug. 24, 1948

2,447,633

UNITED STATES PATENT OFFICE 2,447,633

ELECTRIC VEHICLE CONTROL SYSTEM

Andrew H. Candee, Pittsburgh, Pa., assignor to Westinghouse Electric Corporation, East Pittsburgh, Pa., a corporation of Pennsylvania Application August 30, 1946, Serial No. 694,061

5 Claims. (Cl. 318—102)

My invention relates, generally, to control systems, and, more particularly, to systems for controlling the operation of self-propelled vehicles.

The constant horsepower characteristic of any self-propelled vehicle utilizing an electrical transmission results in a generator characteristic curve which is essentially hyperbolic in shape, the limit at one end being the maximum current which can be safely commutated and the limit at the other end being the maximum voltage which can be generated. Between these two limits the power plant may be fully loaded by adjustment of the voltage to suit the current demand.

In the application of such generators to vehicles it is customary to so design them that the maximum current required for starting and accelerating a particular vehicle is within the maximum limitation of the generator to be utilized on that vehicle. As the speed of the vehicle increases, the ampere load of the generator decreases and the voltage rises. Full engine power can be maintained during this action until the maximum generator voltage is reached. Further decreases in current, because of increased vehicle speed, cannot be accompanied by continued voltage rise, so that full power plant capacity can no longer be utilized. The vehicle speed at which this condition occurs is commonly known as the "unloading" speed.

In Diesel-electric locomotive applications, it is customary to raise the "unloading" speed by several steps of traction motor field shunting. By way of example, the characteristics of a certain generator are such that without field shunting the equipment would unload at 32 miles per hour. At this point the current is increased by shunting the traction motor fields a predetermined amount. The increase in current drops the voltage of the generator and the vehicle speed rises to 52 M. P. H. before full voltage is again reached. At this speed the traction motor fields are shunted to the safe limit, which again increases the current, drops the voltage and raises the ultimate "unloading" speed to 85 M. P. H.

The foregoing method of utilizing full available power over a wide range of vehicle speed is satisfactory in many cases. However, with some combinations of traction motors and generators, the desired result cannot be obtained by field shunting alone. Thus, in a certain locomotive equipment in which three traction motors are to be connected in series-circuit relation across one generator, the "unloading" speed with normal maximum field shunting will be such that full engine loading is obtained over less than half the speed range of the locomotive. This results in inefficient operation of the equipment.

An object of my invention is to increase the loading range of self-propelled vehicles having electrical transmissions.

A more general object of my invention is to provide a vehicle control system which shall be simple and efficient in operation and which may be economically manufactured and installed.

Other objects of my invention will be explained fully hereinafter or will be apparent to those skilled in the art.

In accordance with one embodiment of my invention, the loading range of gas or Diesel-electric equipments may be increased by cutting out one or more motors of a group of series-connected motors for operation in the higher ranges of vehicle speed.

For a better understanding of the nature and objects of my invention, reference may be had to the following detailed description, taken in conjunction with the accompanying drawing, in which.

Figure 1:
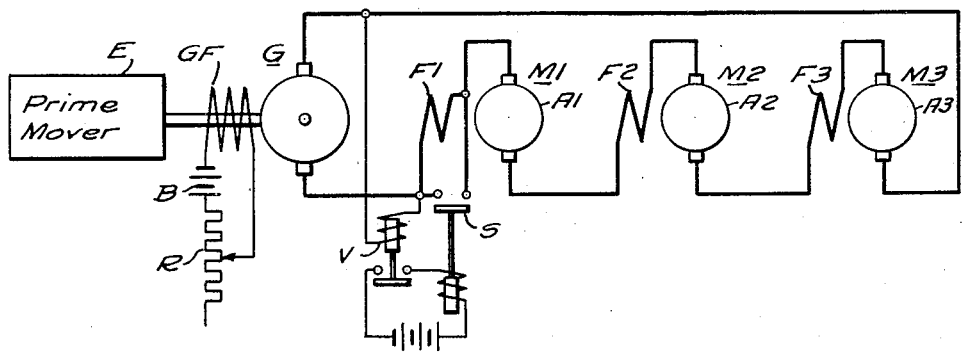
Figure 1 is a diagrammatic view of a control system embodying the principal features of my invention.

Referring to Fig. 1 of the drawing, the system shown therein comprises a plurality of traction motors M1, M2 and M3 for propelling a vehicle (not shown), a generator G for supplying current to the motors and an engine E for driving the generator G. The generator is provided with a field winding GF which may be energized from a battery B, the field current being controlled by a regulating rheostat R.

The motors may be of the series type, the motor M1 having an armature winding A1 and a series field winding F1. Likewise, the motor M2 has an armature winding A2 and a series field winding F2 and the motor M3 has an armature winding A3 and a series field winding F3. The motors are connected in series-circuit relation across the generator during operation of the vehicle.

As explained hereinbefore, the loading range of the equipment may be increased by cutting out one of the series-connected motors while operating in the higher ranges of vehicle speed. In the present case, this may be done by closing a switch S to short circuit the field winding of the motor M1, thereby making the field winding ineffective.

The operation of the switch S may be controlled by a relay V which is responsive to the voltage of the generator G. Thus, when the generator is operating at a certain voltage, the contact members of the relay V are closed. The operation of the relay V causes the switch S to close to short circuit the field winding F1, thereby having the effect of cutting out the motor M1 which permits the generator current to increase and the voltage to decrease.

In this manner, the "unloading" speed of the equipment may be increased, thereby permitting the engine to be fully loaded throughout a greater range of speed. For example, when three traction motors are connected in series, the unloading speed of a particular equipment may be increased from 31 M. P. H. to 45 M. P. H. without the necessity of weakening the field strength of the motor beyond that considered safe to give the 31 M. P. H. unloading speed. This can be done because in the speed range above 31 M. P. H. two traction motors have the electrical capacity to provide the necessary tractive effort for the locomotive, while below 31 M. P. H. it is necessary to use all three motors to pull the train without overheating.

Figure 2:
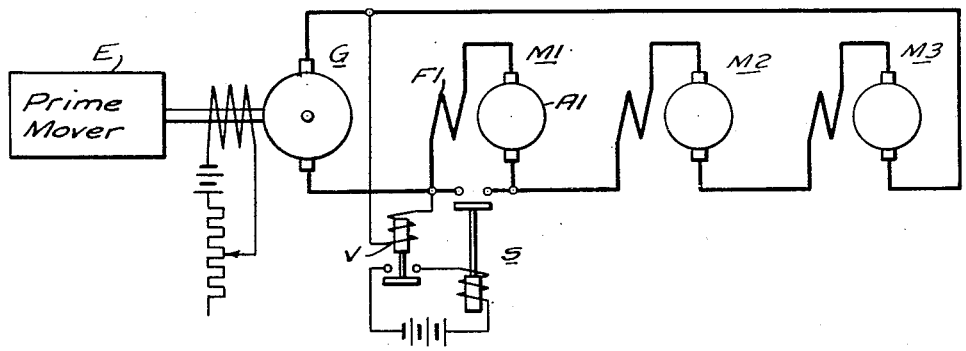
Fig. 2 is a diagrammatic view of a slightly different modification of the invention.

The system shown in Fig. 2 is similar to that shown in Fig. 1 with the exception that the switch S short circuits both the armature winding and the field winding of the motor M1. The effect is similar to that hereinbefore described.

Figure 3:
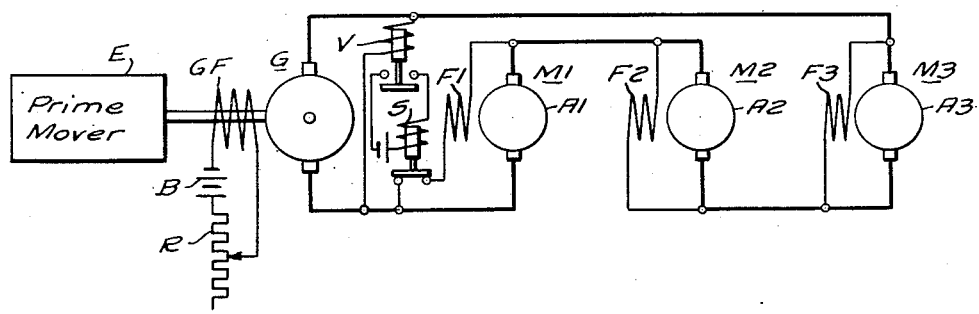
Fig. 3 is a diagrammatic view of another modification of the invention.

In the system shown in Fig. 3, the motors have shunt field windings instead of series field windings. The switch S opens the circuit for the field winding of the motor M1 when the generator develops sufficient voltage to operate the relay V. Thus, excitation is removed from the motor M1, thereby having the effect of cutting out this motor during operation over the higher speed ranges.

From the foregoing description, it is apparent that I have devised a system which provides better power plant loading of an equipment having an electrical transmission, thereby improving the efficiency of the equipment. The present system is particularly suitable for Diesel-electric locomotives and the like, but is not necessarily limited thereto.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a vehicle control system, in combination, a plurality of motors for propelling the vehicle, a generator for supplying current to the motors, an engine for driving the generator, said motors being connected across said generator in series-circuit relation, switching means for making the field winding of at least one of said motors ineffective during part of the speed range of the vehicle, and speed-responsive means for controlling the operation of said switching means.

2. In a vehicle control system, in combination, a plurality of motors for propelling the vehicle, a generator for supplying current to the motors, an engine for driving the generator, said motors being connected across said generator in series-circuit relation, switching means for making the field winding of at least one of said motors ineffective during part of the speed range of the vehicle, and relay means responsive to the generator voltage for controlling the operation of said switching means.

3. In a vehicle control system, in combination, a plurality of motors for propelling the vehicle, a generator for supplying current to the motors, an engine for driving the generator, said motors being connected across said generator in series-circuit relation, switching means for short circuiting the field winding of at least one of said motors during part of the speed range of the vehicle, and relay means responsive to the generator voltage for controlling the operation of said switching means.

4. In a vehicle control system, in combination, a plurality of motors for propelling the vehicle, a generator for supplying current to the motors, an engine for driving the generator, said motors being connected across said generator in series-circuit relation, switching means for short circuiting one of said motors during part of the speed range of the vehicle, and relay means responsive to the generator voltage for controlling the operation of said switching means.

5. In a vehicle control system, in combination, a plurality of motors for propelling the vehicle, a generator for supplying current to the motors, an engine for driving the generator, said motors being connected across said generators in series-circuit relation, switching means for opening the circuit through the field winding of at least one of said motors during part of the speed range of the vehicle, and relay means responsive to the generator voltage for controlling the operation of said switching means.

ANDREW H. CANDEE.

REFERENCES CITED

The following references are of record in the file of this patent:

UNITED STATES PATENTS

| Number | Name | Date |
|---|---|---|
| 292,382 | Stockwell | Jan. 22, 1884 |
| 696,237 | Henry | Mar. 25, 1902 |
| 735,893 | Merrick | Aug. 11, 1903 |